(12) United States Patent
Kou et al.

(10) Patent No.: US 9,425,675 B2
(45) Date of Patent: Aug. 23, 2016

(54) PERMANENT MAGNET SYNCHRONOUS PLANAR MOTOR WITH STRUCTURE OF CONCENTRIC WINDING

(75) Inventors: Baoquan Kou, Harbin (CN); Dagang Xie, Harbin (CN); Lu Zhang, Harbin (CN); He Zhang, Harbin (CN)

(73) Assignee: HARBIN INSTITUTE OF TECHNOLOGY, Harbin, Heilongjiang (CN)

( * ) Notice: Subject to any disclaimer, the term of this patent is extended or adjusted under 35 U.S.C. 154(b) by 183 days.

(21) Appl. No.: 14/116,101

(22) PCT Filed: Jul. 3, 2012

(86) PCT No.: PCT/CN2012/078080
§ 371 (c)(1),
(2), (4) Date: Nov. 6, 2013

(87) PCT Pub. No.: WO2013/078860
PCT Pub. Date: Jun. 6, 2013

(65) Prior Publication Data
US 2014/0252888 A1 Sep. 11, 2014

(30) Foreign Application Priority Data

Nov. 30, 2011 (CN) .......................... 2011 1 0390544

(51) Int. Cl.
*H02K 41/03* (2006.01)
*H02K 41/00* (2006.01)
*H02K 41/02* (2006.01)
*H02K 41/035* (2006.01)

(52) U.S. Cl.
CPC .............. *H02K 41/031* (2013.01); *H02K 41/00* (2013.01); *H02K 41/02* (2013.01); *H02K 41/03* (2013.01); *H02K 41/0356* (2013.01); *H02K 2201/18* (2013.01)

(58) Field of Classification Search
CPC ....... H02K 41/00; H02K 41/02; H02K 41/03; H02K 41/031; H02K 41/0356; H02K 2201/18; B60L 13/03
USPC .......... 310/12.01, 12.05, 12.06, 12.15, 12.16, 310/12.18, 12.21, 12.22, 12.24, 12.25, 310/12.26
See application file for complete search history.

(56) References Cited

U.S. PATENT DOCUMENTS

| | | | | |
|---|---|---|---|---|
| 5,334,892 A * | 8/1994 | Chitayat | ................ | B23Q 1/623 310/12.06 |
| 2010/0100990 A1* | 4/2010 | Trumper | ................ | G01Q 30/00 850/8 |
| 2010/0238425 A1* | 9/2010 | Binnard | ................ | G03B 27/58 355/72 |

*Primary Examiner* — Terrance Kenerly
*Assistant Examiner* — Alexander Singh (57) ABSTRACT

A permanent magnet synchronous planar motor with a structure of concentric winding comprises a primary structure, a secondary structure, and an air gap. Armature windings in the primary structure of the permanent magnet synchronous planar motor are fixed on an air gap side of the primary base plate in a shape of board, wherein the air gap side is defined as a side adjacent to the air gap. The armature winding of each phase comprises a plurality of concentric rectangular coils. The rectangular coils are connected in series in turn from inside to outside, and winding directions of the two adjacent rectangular coils are opposite. A distance $L_c$ between center lines of two opposite sides of each of the rectangular coils and the polar distance $\tau_m$ of the permanent magnet in the secondary structure have a relationship as follows. $L_c=(2k+1)\tau_m$, wherein k is a natural number.

15 Claims, 7 Drawing Sheets

PERMANENT MAGNET SYNCHRONOUS PLANAR MOTOR WITH STRUCTURE OF CONCENTRIC WINDING

CROSS REFERENCE OF RELATED APPLICATION

This is a U.S. National Stage under 35 U.S.C 371 of the International Application PCT/CN2012/078080, filed Jul. 3, 2012, which claims priority under 35 U.S.C. 119(a-d) to CN201110390544.X filed Nov. 30, 2011.

BACKGROUND OF THE PRESENT INVENTION

1. Field of Invention

The present invention relates to a permanent magnet synchronous planar motor, and belongs to a field of electrical machine.

2. Description of Related Arts

Modern precision machining equipments and ultra-precision machining equipments urgently require planar driving devices having high response, high speed, and high precision, in machining, producing electronic products, mechanical handling, manufacturing instruments and meters for automation, even driving robots, etc. Usually the planar driving device is driven by rotating motors. Rotating motion is transferred to rectilinear motion by mechanical devices, such as belts and ball screw shafts. The mechanical device is complicated, and transmission accuracy and transmission speed are limited. In addition, the mechanical device is required to be adjusted frequently in process of using, which causes disadvantages of high cost, poor reliability, and big size.

Original planar driving device is directly driven by two linear motors. This kind of planar driving device has a stacked driving structure, which increases complexity of transmission system. The mode that low dimensional motion mechanisms are overlapped to form a high dimensional motion mechanism is not changed essentially. The linear motor in the bottom layer carries total mass of the linear motor in the upper layer and other relevant mechanical components, so the precision of positioning and controlling is affected seriously.

Planar motor directly driven by electromagnetic energy has characteristic of high output density, low heat consumption, high speed, high accuracy, and high reliability. The middle conversion devices are omitted, which transfers rotating motion to rectilinear motion, and then to planar motion, so the controlled object can be integrated with the planar motor. The planar motor has advantages of quick response, good servo ability, and simple structure.

According to the generating principle of the electromagnetic thrust of the planar motors, the planar motors can be divided into the variable reluctance type, the synchronous type, and the inductive type, wherein the synchronous planar motor has good overall performance of simple structure, big thrust, high efficiency, quick response speed, etc, so the synchronous planar motor is widely applied in two-dimensional planar driving devices, especially in precise two-dimensional planar driving devices.

Figure 19:
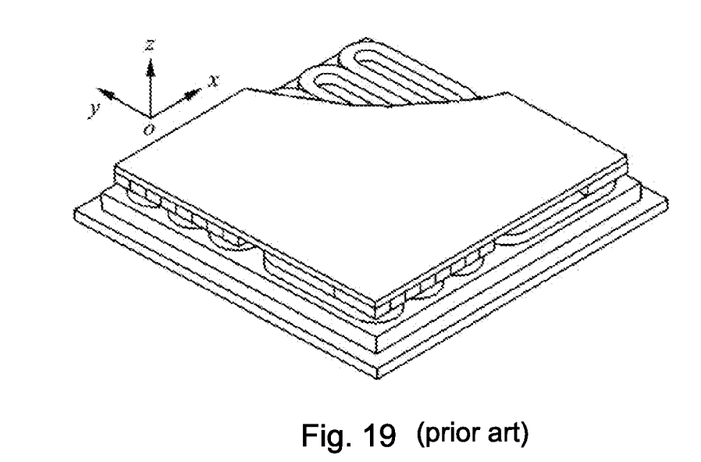
FIG. 19 is a structure view of a conventional permanent magnetic synchronous planar motor.
Figure 20:
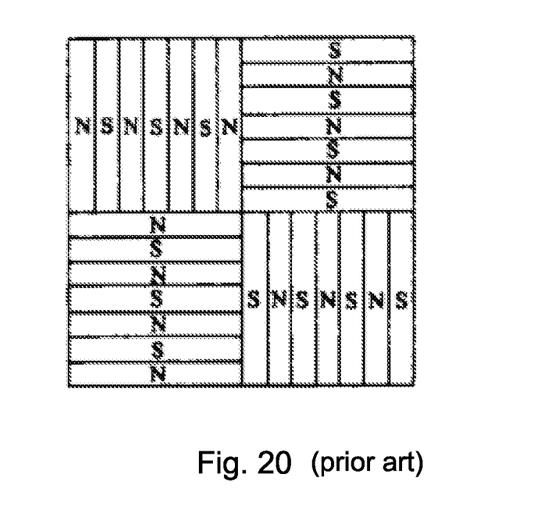
FIG. 20 is a sketch view of a secondary structure of the permanent magnetic synchronous planar motor in FIG. 19.

FIGS. 19~20 show a structure of a conventional permanent magnet synchronous planar motor. The permanent magnet synchronous planar motor mainly comprises two parts, i.e., a stator and a mover. The working principle of the permanent magnet synchronous planar motor is similar to that of three-phase rotating permanent magnet synchronous motor. The stator comprises an iron core, and four thrust windings provided perpendicularly to each other. Each of the thrust windings has three independent phrases. The thrust winding in the X direction is for driving the mover to move along the X direction. The thrust winding in the Y direction is for driving the mover to move along the Y direction. The mover comprises a mover platform, and four permanent magnet arrays. The permanent magnet arrays are arranged on the lower surface of the mover platform. The mover platform is able to realize positioning motions on the plane by controlling the corresponding current of the three-phase winding.

However, the permanent magnet synchronous planar motor has disadvantages of complicated motor structure, small range of planar motion, low using rate of winding, low thrust density, low system efficiency, etc.

SUMMARY OF THE PRESENT INVENTION

Technical Problems

To solve problems of complicated structure, small range of planar motion, low using rate of winding, low thrust density, low system efficiency, etc. of conventional permanent magnet synchronous planar motors, the present invention provides a permanent magnet synchronous planar motor with a structure of concentric winding.

Solutions of the Technical Problems

The permanent magnet synchronous planar motor with the structure of concentric winding in the present invention comprises: a primary structure, a secondary structure, and an air gap. The primary structure comprises: a primary base plate and an armature winding. The secondary structure comprises a secondary yoke plate and a permanent magnet. The air gap is provided between the primary structure and the secondary structure. A mover of the permanent magnet synchronous planar motor with the structure of concentric winding is supposed to realize planar motion in plane XOY.

The armature windings are fixed on an air gap side of the primary base plate in a shape of board, wherein the air gap side is defined as a side adjacent to the air gap. The armature winding of each phase comprises a plurality of concentric rectangular coils. A distance $L_l$ between center lines of two adjacent sides of the two adjacent rectangular coils is equal to a polar distance $\tau_m$ of the permanent magnet in the secondary structure. The rectangular coils are connected in series in turn from inside to outside. Winding directions of the two adjacent rectangular coils 1 are opposite. A distance $L_c$ between center lines of two opposite sides of each of the rectangular coils and the polar distance $\tau_m$ of the permanent magnet in the secondary structure have a relationship as follows. $L_c=(2k+1)\tau_m$, wherein k is a natural number.

The secondary structure in the permanent magnet synchronous planar motor with the structure of concentric winding recited above is embodied as a surface permanent magnet structure, an embedded permanent magnet structure, or Halbac permanent magnet array structure.

The secondary structure in the permanent magnet synchronous planar motor with the structure of concentric winding recited above is embodied as five structures as follows.

Structure 1

The secondary structure comprises a secondary yoke plate and a plurality of magnetic pole units. Each of the magnetic pole units is a cube having a square bottom. Diagonals on a surface at an air gap side of each of the magnetic pole units are parallel to axis X or axis Y. The magnetic pole units are arranged closely, and fixed on an air gap side of the secondary yoke plate. Magnetization directions of the adjacent magnetic pole units are opposite to each other. Each of the magnetic pole units comprises a permanent magnet magnetized in a radial direction and a center magnetic pole. The center magnetic pole has a structure of axial symmetry. An axial section of the center magnetic pole is a polygon comprising two rectangles, and the rectangle at the air gap side is smaller than the other rectangle. A symmetry axis of the center magnetic pole is perpendicular to a surface of the secondary yoke plate. The center magnetic pole is embedded in a center portion of the permanent magnet magnetized in the radial direction. A height of the center magnetic pole is equal to a height of the permanent magnet magnetized in the radial direction. The center magnetic pole is magnetized in a radial direction.

Structure 2

The secondary structure comprises a secondary yoke plate and a plurality of magnetic pole units. Each of the magnetic pole units is a cube having a square bottom. Diagonals of each of the magnetic pole units are parallel to axis X or axis Y. The magnetic pole units are arranged closely, and fixed on an air gap side of the secondary yoke plate. Magnetization directions of the adjacent magnetic pole units are opposite to each other. Each of the magnetic pole units comprises four permanent magnets magnetized parallelly, a permanent magnet magnetized vertically, and a magnetism gathering element. Magnetizing the permanent magnet parallelly means that magnetization direction of the permanent magnet is parallel to a surface of the permanent magnet at an air gap side. Magnetizing the permanent magnet vertically means that magnetization direction of the permanent magnet is perpendicular to the surface of the permanent magnet at the air gap side. The permanent magnet magnetized vertically and the magnetism gathering element are cubes having square bottoms. The bottom of the magnetism gathering element is smaller than the bottom of the permanent magnet magnetized vertically. The magnetism gathering element overlaps the permanent magnet magnetized vertically in a center of an upper surface thereof, to form a center magnetic pole. The center magnetic pole is provided in the center of the magnetic pole unit. The four permanent magnets magnetized parallelly are irregulars having bottom projections of isosceles trapezoid. Basic angles of the isosceles trapezoid are 45°. A height of the permanent magnets magnetized parallelly is equal to a height of the center magnetic pole. The four permanent magnets magnetized parallelly are respectively provided at four sides of the center magnetic pole, and closely engage with outer surfaces of the center magnetic pole. The magnetization directions of the four permanent magnets magnetized parallelly are toward or opposite to the center magnetic pole, and the magnetization directions are parallel to axis X and axis Y.

Structure 3

The secondary structure comprises a secondary yoke plate and a plurality of magnetic pole units. Each of the magnetic pole units is a cube having a square bottom. Diagonals of each of the magnetic pole units are parallel to axis X or axis Y. The magnetic pole units are arranged closely, and fixed on an air gap side of the secondary yoke plate. Magnetization directions of the adjacent magnetic pole units are opposite to each other. Each of the magnetic pole units comprises four permanent magnets magnetized in a radial direction, a permanent magnet magnetized vertically, and a magnetism gathering element. Magnetizing the permanent magnet in the radial direction means that magnetization direction of the permanent magnet is parallel to a surface of the permanent magnet at an air gap side, and toward to a center of the magnetic pole unit. Magnetizing the permanent magnet vertically means that magnetization direction of the permanent magnet is perpendicular to the surface of the permanent magnet at the air gap side. The permanent magnet magnetized vertically and the magnetism gathering element are cubes having square bottoms. The bottom of the magnetism gathering element is smaller than the bottom of the permanent magnet magnetized vertically. The magnetism gathering element overlaps the permanent magnet magnetized vertically in a center of an upper surface thereof, to form a center magnetic pole. The center magnetic pole is provided in the center of the magnetic pole unit. The four permanent magnets magnetized in the radial direction are irregulars having bottom projections of isosceles trapezoid. Basic angles of the isosceles trapezoid are 45°. A height of the permanent magnets magnetized in the radial direction is equal to a height of the center magnetic pole. The four permanent magnets magnetized in the radial direction are respectively provided at four sides of the center magnetic pole, and closely engage with outer surfaces of the center magnetic pole. The magnetization directions of the four permanent magnets magnetized in the radial direction are toward or opposite to the center magnetic pole, and the magnetization directions are parallel to axis X and axis Y.

Structure 4

The secondary structure comprises a secondary yoke plate and a plurality of magnetic pole units. Each of the magnetic pole units is a cube having a square bottom. Diagonals of each of the magnetic pole units are parallel to axis X or axis Y. The magnetic pole units are arranged closely, and fixed on an air gap side of the secondary yoke plate. Magnetization directions of the adjacent magnetic pole units are opposite to each other. Each of the magnetic pole units comprises four permanent magnets magnetized in a radial direction, and two permanent magnets magnetized vertically. Magnetizing the permanent magnet in the radial direction means that magnetization direction of the permanent magnet is parallel to a surface of the permanent magnet at an air gap side, and toward to a center of the magnetic pole unit. Magnetizing the permanent magnet vertically means that magnetization direction of the permanent magnet is perpendicular to the surface of the permanent magnet at the air gap side. Both of the two permanent magnets magnetized vertically are cubes having square bottoms, wherein the bottom of the first permanent magnet magnetized vertically is smaller than the bottom of the second permanent magnet magnetized vertically. The two permanent magnets magnetized vertically are overlapped to form a center magnetic pole, and the permanent magnet magnetized vertically having the smaller bottom is on the permanent magnet magnetized vertically having the larger bottom. The center magnetic pole is provided in the center of the magnetic pole unit. The four permanent magnets magnetized in the radial direction are irregulars having bottom projections of isosceles trapezoid. Basic angles of the isosceles trapezoid are 45°. A height of the permanent magnets magnetized in the radial direction is equal to a height of the center magnetic pole. The four permanent magnets magnetized in the radial direction are respectively provided at four sides of the center magnetic pole, and closely engage with outer surfaces of the center magnetic pole. The magnetization directions of the four permanent magnets magnetized in the radial direction are toward or opposite to the center magnetic pole, and the magnetization directions are parallel to axis X and axis Y.

Structure 5

The secondary structure comprises a secondary yoke plate and a plurality of magnetic pole units. Each of the magnetic pole units is a cube having a square bottom. Diagonals of each of the magnetic pole units are parallel to axis X or axis Y. The magnetic pole units are arranged closely, and fixed on an air gap side of the secondary yoke plate. Magnetization directions of the adjacent magnetic pole units are opposite to each other. Each of the magnetic pole units comprises four permanent magnets magnetized parallelly, and two permanent magnets magnetized vertically. Magnetizing the permanent magnet parallelly means that magnetization direction of the permanent magnet is parallel to a surface of the permanent magnet at an air gap side. Magnetizing the permanent magnet vertically means that magnetization direction of the permanent magnet is perpendicular to the surface of the permanent magnet at the air gap side. Both of the two permanent magnets magnetized vertically are cubes having square bottoms, wherein the bottom of the first permanent magnet magnetized vertically is smaller than the bottom of the second permanent magnet magnetized vertically. The two permanent magnets magnetized vertically are overlapped to form a center magnetic pole, and the permanent magnet magnetized vertically having the smaller bottom is on the permanent magnet magnetized vertically having the larger bottom. The center magnetic pole is provided in the center of the magnetic pole unit. The four permanent magnets magnetized parallelly are irregulars having bottom projections of isosceles trapezoid. Basic angles of the isosceles trapezoid are 45°. A height of the permanent magnets magnetized parallelly is equal to a height of the center magnetic pole. The four permanent magnets magnetized parallelly are respectively provided at four sides of the center magnetic pole, and closely engage with outer surfaces of the center magnetic pole. The magnetization directions of the four permanent magnets magnetized parallelly are toward or opposite to the center magnetic pole, and the magnetization directions are parallel to axis X and axis Y.

Beneficial Effects of the Present Invention

The planar motor provided by the present invention comprises a structure of concentric armature winding. The planar motor is driven by recombination current, and the mover of the planar motor is able to realize planar motion in plane XOY. The planar motor has characteristics of unlimited range of planar motion, simple structure, large thrust density, good dynamic characteristics, high using rate of windings, even distribution of temperature, small thermal deformation, high positioning accuracy, etc. In addition, the present invention is easily to be utilized to form a planar motor having a high thrust. The secondary structure has a high degree of freedom, few wires between phases, and high reliability.

These and other objectives, features, and advantages of the present invention will become apparent from the following detailed description, the accompanying drawings, and the appended claims.

DETAILED DESCRIPTION OF THE PREFERRED EMBODIMENT

Embodiment 1

A permanent magnet synchronous planar motor with a structure of concentric winding according to the embodiment 1 comprises: a primary structure, a secondary structure, and an air gap. The primary structure comprises: a primary base plate 2 and armature windings. The secondary structure comprises a secondary yoke plate 4 and a permanent magnet. The air gap is provided between the primary structure and the secondary structure. A mover of the permanent magnet synchronous planar motor with the structure of concentric winding is supposed to realize planar motion in plane XOY.

The armature windings are fixed on an air gap side of the primary base plate 2 in a shape of board, wherein the air gap side is defined as a side adjacent to the air gap. The armature winding of each phase comprises a plurality of concentric rectangular coils 1. A distance $L_l$ between center lines of two adjacent sides of the two adjacent rectangular coils 1 is equal to a polar distance $\tau_m$ of the permanent magnet in the secondary structure. The rectangular coils 1 are connected in series in turn from inside to outside. Winding directions of the two adjacent rectangular coils 1 are opposite. A distance $L_c$ between center lines of two opposite sides of each of the rectangular coils 1 and the polar distance $\tau_m$ of the permanent magnet in the secondary structure have a relationship as follows. $L_c=(2k+1)\tau_m$, wherein k is a natural number.

FIGS. 1~5 show three specific structures of the primary structure according to the embodiment 1.

Figure 1:
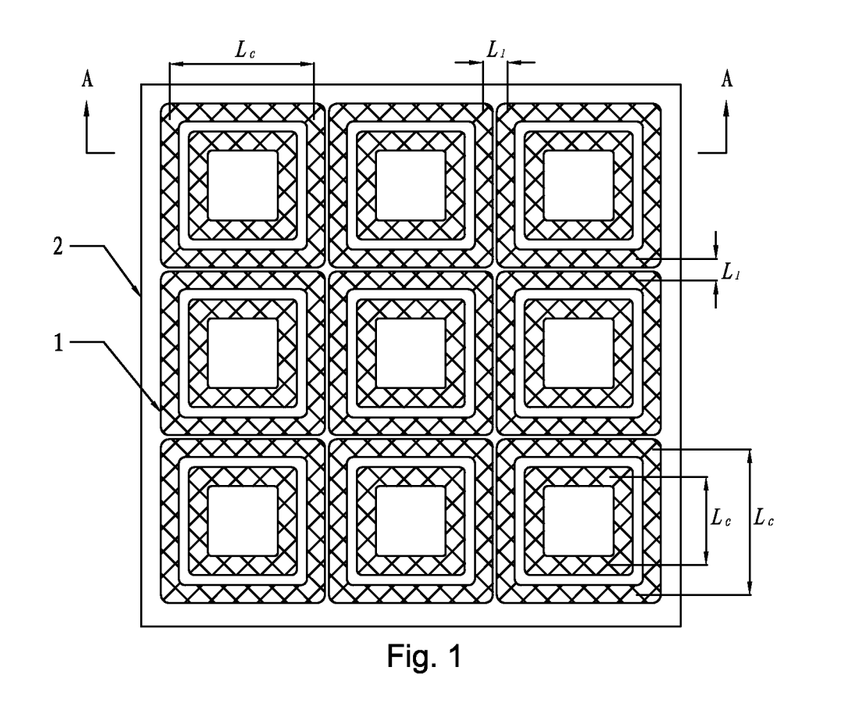
FIG. 1 is a sketch view of a side of a primary structure adjacent to an air gap according to embodiment 1 of the present invention, and an armature winding of each phase in a secondary structure comprises two concentric square coils.
Figure 4:
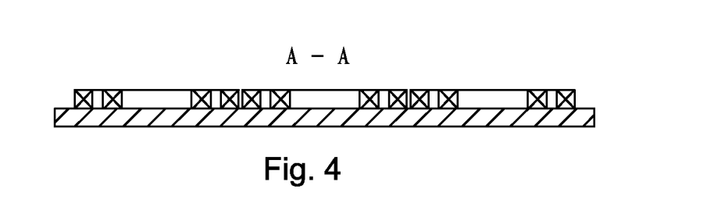
FIG. 4 is a sectional view of FIG. 1 and FIG. 3 in a direction A-A.

FIG. 1 is a sketch view of the primary structure according to the embodiment 1. FIG. 4 is a sectional view of FIG. 1 in a direction A-A, wherein the armature winding of each phase comprises two concentric square coils.

Figure 2:
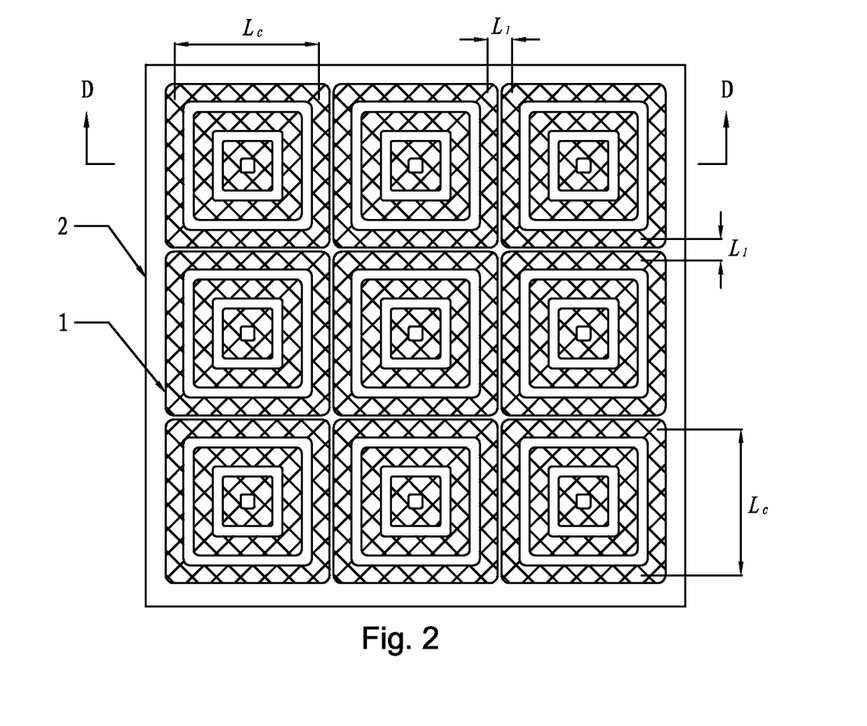
FIG. 2 is a sketch view of the side of the primary structure adjacent to the air gap according to embodiment 1 of the present invention, and the armature winding of each phase in the secondary structure comprises three concentric square coils.
Figure 5:
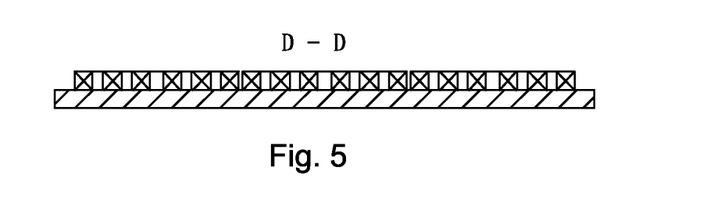
FIG. 5 is a sectional view of FIG. 5 in a direction D-D.

FIG. 2 is a sketch view of the primary structure according to the embodiment 1. FIG. 5 is a sectional view of FIG. 2 in a direction D-D, wherein the armature winding of each phase comprises three concentric square coils.

Figure 3:
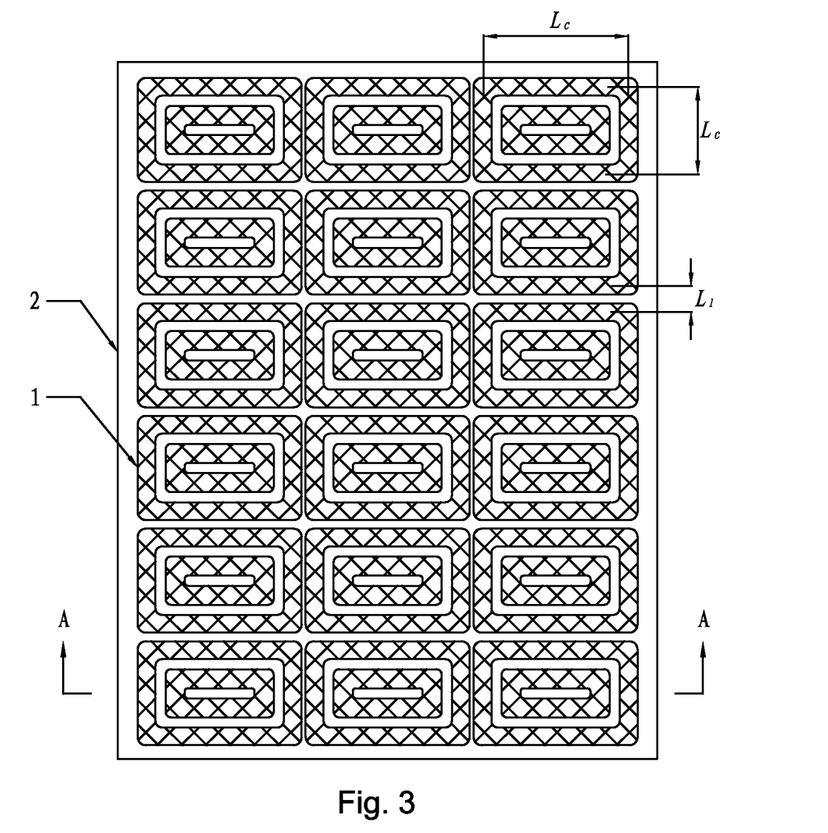
FIG. 3 is a sketch view of the side of the primary structure adjacent to the air gap according to embodiment 1 of the present invention, and the armature winding of each phase in the secondary structure comprises two concentric rectangular coils.

FIG. 3 is a sketch view of the primary structure according to the embodiment 1. FIG. 4 is a sectional view of FIG. 3 in a direction A-A, wherein the armature winding of each phase comprises two concentric rectangular coils.

Embodiment 2

A difference between the permanent magnet synchronous planar motor with the structure of concentric winding in the embodiment 2 and the permanent magnet synchronous planar motor with the structure of concentric winding in the embodiment 1 is that the primary structure further comprises a deflection controlling winding.

The deflection controlling winding is fixed on the air gap side of the primary base plate 2 in the shape board, and the deflection controlling winding is around the armature windings. The deflection controlling winding comprises: a deflection controlling winding in an X direction, and a deflection controlling winding in a Y direction, wherein the deflection controlling winding in the X direction comprises an even number of coils, the even number of coils are evenly divided into two groups, center lines of the coils in a same group are in a same line, which is parallel to axis X, active sides of the coils are parallel to the axis X, winding directions of the adjacent coils in the same group are opposite, the two groups of coils are respectively provided at two sides of the armature windings in the direction Y, and are distributed symmetrically, the two coils provided in corresponding positions of the two sides of the armature windings have winding directions opposite to each other, the deflection controlling winding in the Y direction comprises an even number of coils, the even number of coils are evenly divided into two groups, center lines of the two coils in a same group are in a same line, which is parallel to axis Y, active sides of the coils are parallel to the axis Y, winding directions of the adjacent coils in the same group are opposite, the two groups of coils are provided at two sides of the armature windings in the direction X, and are distributed symmetrically, and the two coils located in corresponding positions of the two sides of the armature windings have winding directions opposite to each other, a distance between center lines of two active sides of each of the coils forming the deflection controlling winding is equal to the polar distance $\tau_m$ of the permanent magnet in the secondary structure, and a distance $L_{c1}$ between center lines of two coils located in a same end of the primary base plate 2 is calculated by: $L_{c1}=(i+\frac{1}{2})\tau_m$ wherein i is a natural number larger than 2.

The deflection controlling winding is for controlling deflecting angle and horizontal angle of the secondary structure. The deflection controlling winding is controlled and driven by a driver, or is controlled by a plurality of controllers.

When the deflection controlling winding is controlled by a controller, after the coils in the deflection controlling winding in the X direction are connected end to end in turn, the coils in the deflection controlling winding in the X direction are connected with the controller, and after the coils in the deflection controlling winding in the Y direction are connected end to end in turn, the coils in the deflection controlling winding in the Y direction are connected with the controller. The controller controls the deflection controlling winding in the X direction and the deflection controlling winding in the Y direction simultaneously according practical requirements.

When the deflection controlling winding in the X direction and the deflection controlling winding in the Y direction are respectively controlled, the coils in the deflection controlling winding in the X direction and the deflection controlling winding in the Y direction are respectively controlled by the driver.

Figure 6:
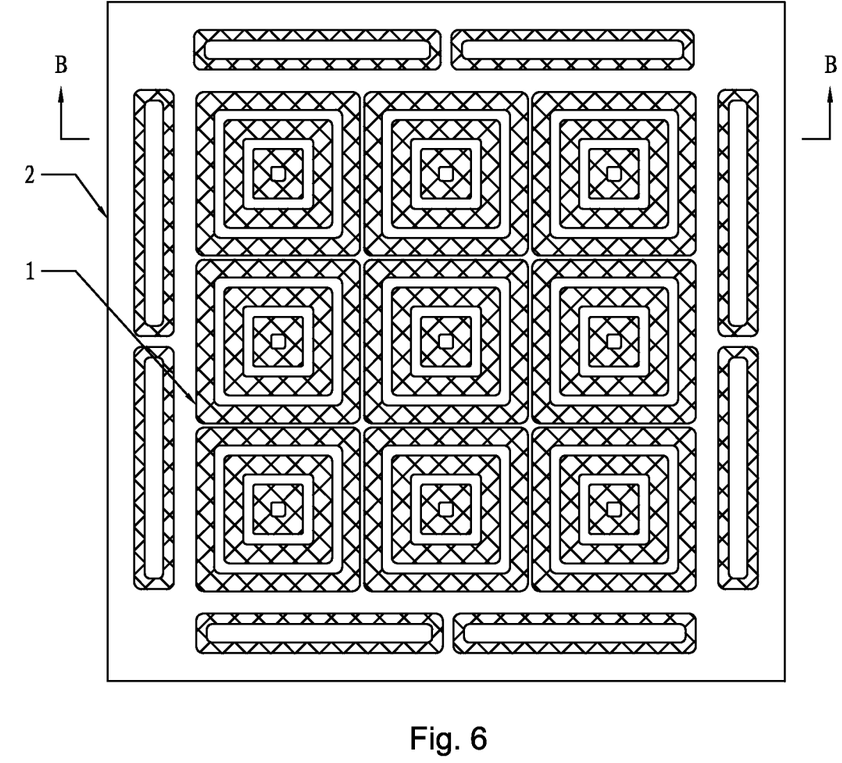
FIG. 6 is a sketch view of the side of the primary structure adjacent to the air gap according to embodiment 2 of the present invention, and the armature winding of each phase in the secondary structure comprises three concentric square coils, four deflection controlling windings in an X direction, and four deflection controlling windings in a Y direction.
Figure 7:
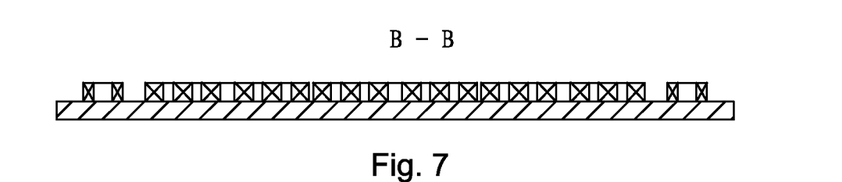
FIG. 7 is a sectional view of FIG. 6 in a direction B-B.
Figure 8:
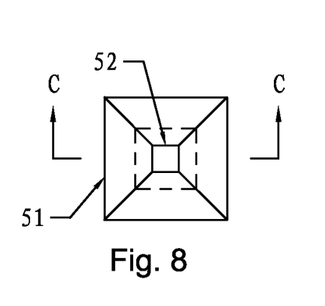
FIG. 8 is a top view of a magnetic pole unit 5 in the secondary structure according to embodiment 6 and embodiment 7 of the present invention.
Figure 9:
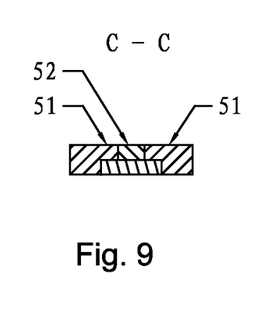
FIG. 9 is a sectional view of the magnetic pole unit 5 in a direction C-C according to embodiment 7, wherein the magnetic pole unit 5 comprises permanent magnets and a magnetism gathering element.
Figure 10:
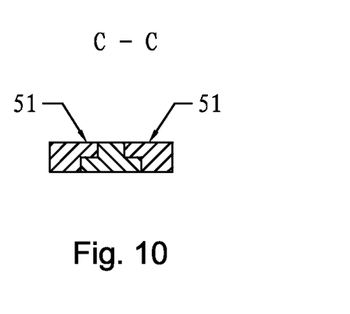
FIG. 10 is a sectional view of the magnetic pole unit 5 in the direction C-C according to embodiment 6, wherein the magnetic pole unit 5 only comprises permanent magnets.
Figure 11:
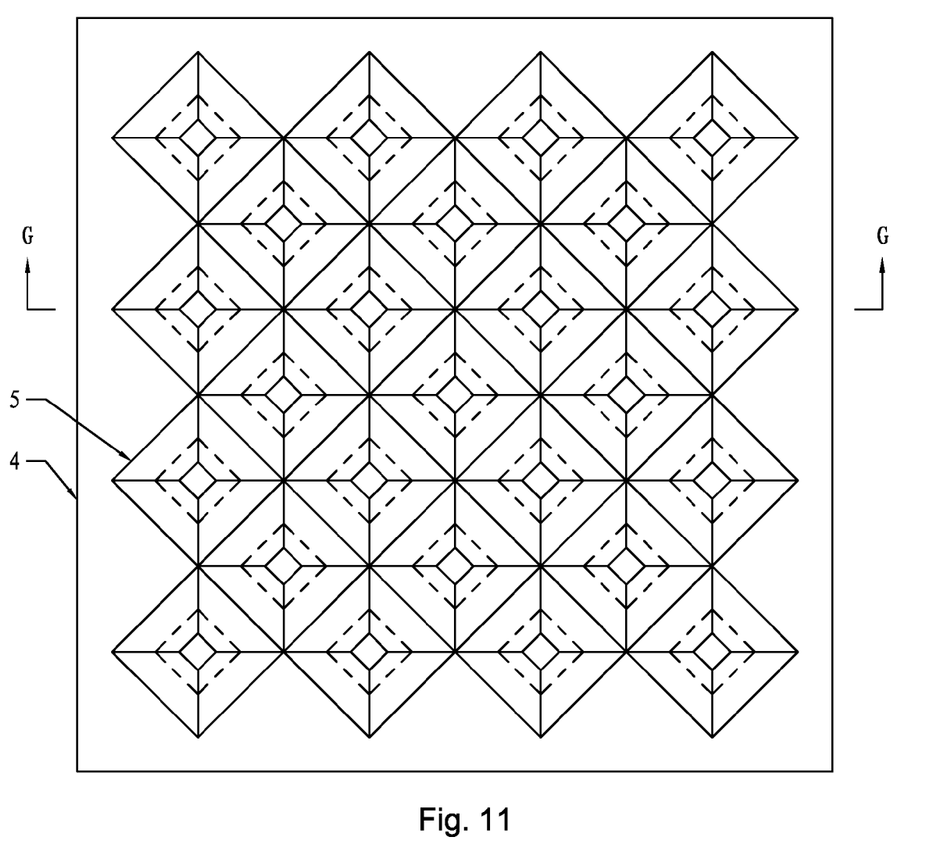
FIG. 11 is a sketch view of the secondary structure according to embodiment 6 of the present invention.
Figure 12:
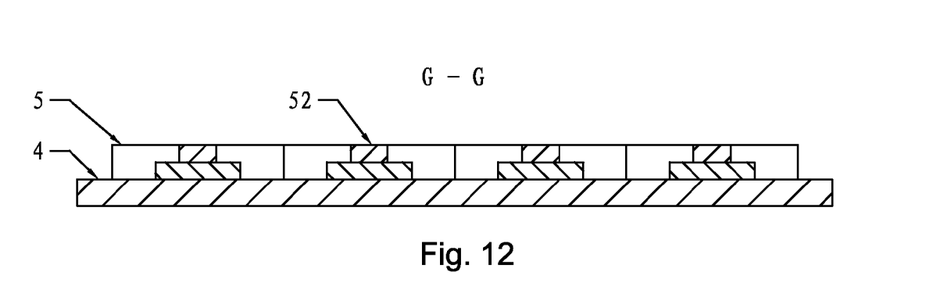
FIG. 12 is a sectional view of FIG. 11 in a direction G-G.

Referring to FIG. 6 and FIG. 7, FIG. 6 and FIG. 7 show a primary structure according to the embodiment 2. In the primary structure, the deflection controlling winding in the X direction comprises four coils of racetrack type. Two of the coils form a group, and center lines of the two coils in a same group are in a same line parallel to axis X. Active sides of the two coils are all parallel to axis X. Winding directions of the two coils in the same group are opposite to each other. The two groups of coils are respectively provided at two sides of the armature windings in the direction Y, and are distributed symmetrically. Two coils provided on each angle of the primary base plate 2 have winding directions opposite to each other.

The deflection controlling winding in the Y direction comprises four coils of racetrack type. Two of the coils form a group, and center lines of the two coils in a same group are in a same line parallel to axis Y. Active sides of the two coils are all parallel to axis Y. Winding directions of the two coils in the same group are opposite to each other. The two groups of coils are respectively provided at two sides of the armature windings in the direction X, and are distributed symmetrically. Two coils provided on each angle of the primary base plate 2 have winding directions opposite to each other.

The rectangular coils 1 forming the armature winding, as recited in the embodiment 1 and the embodiment 2, are preferably non-square rectangular coils or square coils. To make machining convenient, corners of the coils are rounded corners.

The primary base plate 2, as recited in the embodiment 1 and the embodiment 2, is made of nonmagnetic material, or magnetic material.

Embodiment 3

A difference between the permanent magnet synchronous planar motor with the structure of concentric winding in the embodiment 3 and the permanent magnet synchronous planar motor with the structure of concentric winding in the embodiment 2 is that the deflection controlling winding is in a shape of rectangle or racetrack. A distance $L_e$ between two end portions of each of coils and the polar distance $\tau_m$ of the permanent magnet in the secondary structure have a relationship as follows. $L_e=2n\tau_m$, wherein n is a positive integer. The two end portions refer to non-active sides of the coil.

Embodiment 4

The secondary structure, as recited in the embodiment 1, the embodiment 2, or the embodiment 3, is embodied as a surface permanent magnet structure, an embedded permanent magnet structure, Halbac permanent magnet array structure, or other secondary permanent magnet structure.

The permanent magnet in the secondary structure is embodied as rare earth permanent magnet having high performance A number of phase, as recited in the embodiment 1, the embodiment 2, or the embodiment 3, is two, three, five, six, or other number larger than 6. The primary structure in the permanent magnet synchronous planar motor with the structure of concentric winding is used as the mover, or the secondary structure in the permanent magnet synchronous planar motor with the structure of concentric winding is used as the mover.

Embodiment 5

The embodiment 5 shows further limitations of the secondary structure of the permanent magnet synchronous planar motor with the structure of concentric winding, as recited in the embodiment 1, the embodiment 2, or the embodiment 3. The secondary structure recited in the embodiment 5 comprises a secondary yoke plate 4 and a plurality of magnetic pole units 5. Each of the magnetic pole units 5 is a cube having a square bottom. Diagonals on a surface at an air gap side of each of the magnetic pole units 5 are parallel to axis X or axis Y. The magnetic pole units 5 are arranged closely, and fixed on an air gap side of the secondary yoke plate 4. Magnetization directions of the adjacent magnetic pole units 5 are opposite to each other.

Each of the magnetic pole units 5 comprises a permanent magnet magnetized in a radial direction and a center magnetic pole 52. The center magnetic pole 52 has a structure of axial symmetry. An axial section of the center magnetic pole 52 is a polygon comprising two rectangles, and the rectangle at the air gap side is smaller than the other rectangle. A symmetry axis of the center magnetic pole 52 is perpendicular to a surface of the secondary yoke plate 4. The center magnetic pole 52 is embedded in a center portion of the permanent magnet magnetized in the radial direction. A height of the center magnetic pole 52 is equal to a height of the permanent magnet magnetized in the radial direction. The center magnetic pole 52 is magnetized in a radial direction.

Figure 13:
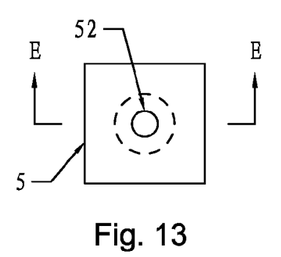
FIG. 13 is a structure view of the magnetic pole unit 5 according to embodiment 5 of the present invention.
Figure 14:
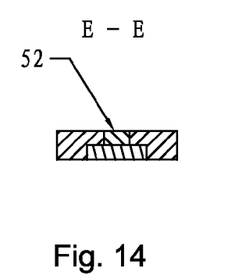
FIG. 14 is a sectional view of a center magnetic pole 52 in FIG. 13 in a direction E-E, wherein the center magnetic pole 52 comprises two cylinder permanent magnets.
Figure 15:
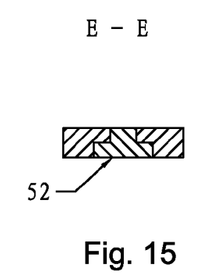
FIG. 15 is a sectional view of the center magnetic pole 52 in FIG. 13 in a direction E-E, wherein the center magnetic pole 52 is a whole permanent magnet.
Figure 16:
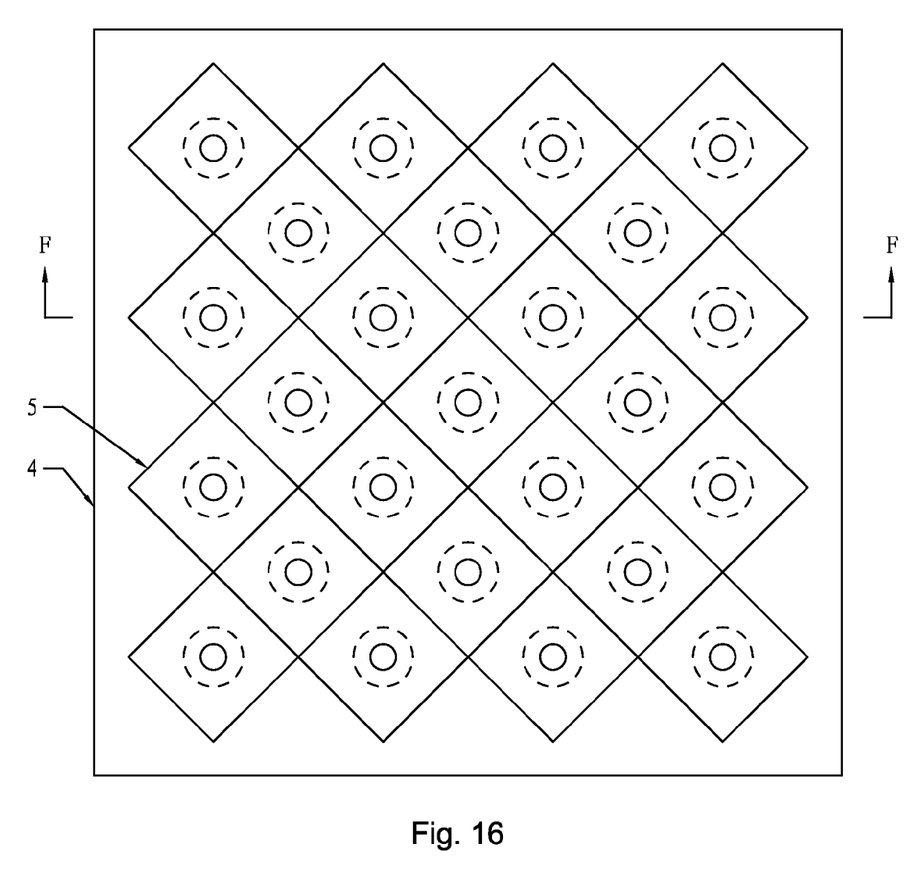
FIG. 16 is a sketch view of the secondary structure according to embodiment 5 of the present invention.
Figure 17:
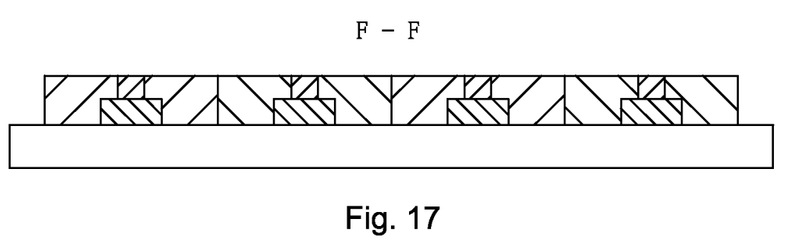
FIG. 17 is a sectional view of FIG. 16 in direction F-F.

Referring to FIG. 16, FIG. 16 shows a sketch view of the secondary structure recited in the embodiment 5. The center magnetic pole 52 is formed by overlapping two cylinder permanent magnets. Referring to FIG. 13 and FIG. 14, the two cylinder permanent magnets are integrated, i.e., the center magnetic pole 52 is formed by one permanent magnet, as shown in FIG. 13 and FIG. 15.

Embodiment 6

Referring to FIG. 8, FIG. 10, FIG. 11, and FIG. 12, the embodiment 6 shows further limitations of the secondary structure of the permanent magnet synchronous planar motor with the structure of concentric winding, as recited in the embodiment 1, the embodiment 2, or the embodiment 3. The secondary structure recited in the embodiment 6 comprises a secondary yoke plate 4 and a plurality of magnetic pole units 5. Each of the magnetic pole units 5 is a cube having a square bottom. Diagonals of each of the magnetic pole units 5 are parallel to axis X or axis Y. The magnetic pole units 5 are arranged closely, and fixed on an air gap side of the secondary yoke plate 4. Magnetization directions of the adjacent magnetic pole units 5 are opposite to each other.

Each of the magnetic pole units 5 comprises four permanent magnets 51 magnetized parallelly, a permanent magnet magnetized vertically, and a magnetism gathering element. Magnetizing the permanent magnet parallelly means that magnetization direction of the permanent magnet is parallel to a surface of the permanent magnet at an air gap side. Magnetizing the permanent magnet vertically means that magnetization direction of the permanent magnet is perpendicular to the surface of the permanent magnet at the air gap side. The permanent magnet magnetized vertically and the magnetism gathering element are cubes having square bottoms. The bottom of the magnetism gathering element is smaller than the bottom of the permanent magnet magnetized vertically. The magnetism gathering element overlaps the permanent magnet magnetized vertically in a center of an upper surface thereof, to form a center magnetic pole 52. The center magnetic pole 52 is provided in the center of the magnetic pole unit 5. The four permanent magnets 51 magnetized parallelly are irregulars having bottom projections of isosceles trapezoid. Basic angles of the isosceles trapezoid are 45°. A height of the permanent magnets 51 magnetized parallelly is equal to a height of the center magnetic pole 52. The four permanent magnets 51 magnetized parallelly are respectively provided at four sides of the center magnetic pole 52, and closely engage with outer surfaces of the center magnetic pole 52. The magnetization directions of the four permanent magnets 51 magnetized parallelly are toward or opposite to the center magnetic pole 52, and the magnetization directions are parallel to axis X and axis Y.

Embodiment 7

Referring FIG. 8, FIG. 9, FIG. 11, and FIG. 12, the embodiment 7 shows further limitations of the secondary structure of the permanent magnet synchronous planar motor with the structure of concentric winding, as recited in the embodiment 1, or the embodiment 2. The secondary structure recited in the embodiment 7 comprises a secondary yoke plate 4 and a plurality of magnetic pole units 5.

Each of the magnetic pole units 5 is a cube having a square bottom. Diagonals of each of the magnetic pole units 5 are parallel to axis X or axis Y. The magnetic pole units 5 are arranged closely, and fixed on an air gap side of the secondary yoke plate 4. Magnetization directions of the adjacent magnetic pole units 5 are opposite to each other. Each of the magnetic pole units 5 comprises four permanent magnets magnetized in a radial direction, a permanent magnet magnetized vertically, and a magnetism gathering element. Magnetizing the permanent magnet in the radial direction means that magnetization direction of the permanent magnet is parallel to a surface of the permanent magnet at an air gap side, and toward to a center of the magnetic pole unit 5. Magnetizing the permanent magnet vertically means that magnetization direction of the permanent magnet is perpendicular to the surface of the permanent magnet at the air gap side. The permanent magnet magnetized vertically and the magnetism gathering element are cubes having square bottoms. The bottom of the magnetism gathering element is smaller than the bottom of the permanent magnet magnetized vertically. The magnetism gathering element overlaps the permanent magnet magnetized vertically in a center of an upper surface thereof, to form a center magnetic pole 52. The center magnetic pole 52 is provided in the center of the magnetic pole unit 5. The four permanent magnets magnetized in the radial direction are irregulars having bottom projections of isosceles trapezoid. Basic angles of the isosceles trapezoid are 45°. A height of the permanent magnets magnetized in the radial direction is equal to a height of the center magnetic pole 52. The four permanent magnets magnetized in the radial direction are respectively provided at four sides of the center magnetic pole 52, and closely engage with outer surfaces of the center magnetic pole 52. The magnetization directions of the four permanent magnets magnetized in the radial direction are toward or opposite to the center magnetic pole 52, and the magnetization directions are parallel to axis X and axis Y.

Embodiment 8

The embodiment 8 shows further limitations of the secondary structure of the permanent magnet synchronous planar motor with the structure of concentric winding, as recited in the embodiment 1, or the embodiment 2. The secondary structure recited in the embodiment 8 comprises a secondary yoke plate 4 and a plurality of magnetic pole units 5. Each of the magnetic pole units 5 is a cube having a square bottom. Diagonals of each of the magnetic pole units 5 are parallel to axis X or axis Y. The magnetic pole units 5 are arranged closely, and fixed on an air gap side of the secondary yoke plate 4. Magnetization directions of the adjacent magnetic pole units 5 are opposite to each other.

Each of the magnetic pole units 5 comprises four permanent magnets magnetized in a radial direction, and two permanent magnets magnetized vertically. Magnetizing the permanent magnet in the radial direction means that magnetization direction of the permanent magnet is parallel to a surface of the permanent magnet at an air gap side, and toward to a center of the magnetic pole unit 5. Magnetizing the permanent magnet vertically means that magnetization direction of the permanent magnet is perpendicular to the surface of the permanent magnet at the air gap side. Both of the two permanent magnets magnetized vertically are cubes having square bottoms, wherein the bottom of the first permanent magnet magnetized vertically is smaller than the bottom of the second permanent magnet magnetized vertically. The two permanent magnets magnetized vertically are overlapped to form a center magnetic pole 52, and the permanent magnet magnetized vertically having the smaller bottom is on the permanent magnet magnetized vertically having the larger bottom. The center magnetic pole 52 is provided in the center of the magnetic pole unit 5. The four permanent magnets magnetized in the radial direction are irregulars having bottom projections of isosceles trapezoid. Basic angles of the isosceles trapezoid are 45°. A height of the permanent magnets magnetized in the radial direction is equal to a height of the center magnetic pole 52. The four permanent magnets magnetized in the radial direction are respectively provided at four sides of the center magnetic pole 52, and closely engage with outer surfaces of the center magnetic pole 52. The magnetization directions of the four permanent magnets magnetized in the radial direction are toward or opposite to the center i magnetic pole 52, and the magnetization directions are parallel to axis X and axis Y.

Embodiment 9

The embodiment 9 shows further limitations of the secondary structure of the permanent magnet synchronous planar motor with the structure of concentric winding, as recited in the embodiment 1, or the embodiment 2. The secondary structure recited in the embodiment 9 comprises a secondary yoke plate 4 and a plurality of magnetic pole units 5. Each of the magnetic pole units 5 is a cube having a square bottom. Diagonals of each of the magnetic pole units 5 are parallel to axis X or axis Y. The magnetic pole units 5 are arranged closely, and fixed on an air gap side of the secondary yoke plate 4. Magnetization directions of the adjacent magnetic pole units 5 are opposite to each other.

Each of the magnetic pole units 5 comprises four permanent magnets 51 magnetized parallelly, and two permanent magnets magnetized vertically. Magnetizing the permanent magnet parallelly means that magnetization direction of the permanent magnet is parallel to a surface of the permanent magnet at an air gap side. Magnetizing the permanent magnet vertically means that magnetization direction of the permanent magnet is perpendicular to the surface of the permanent magnet at the air gap side. Both of the two permanent magnets magnetized vertically are cubes having square bottoms, wherein the bottom of the first permanent magnet magnetized vertically is smaller than the bottom of the second permanent magnet magnetized vertically. The two permanent magnets magnetized vertically are overlapped to form a center magnetic pole 52, and the permanent magnet magnetized vertically having the smaller bottom is on the permanent magnet magnetized vertically having the larger bottom. The center magnetic pole 52 is provided in the center of the magnetic pole unit 5. The four permanent magnets 51 magnetized parallelly are irregulars having bottom projections of isosceles trapezoid. Basic angles of the isosceles trapezoid are 45°. A height of the permanent magnets 51 magnetized parallelly is equal to a height of the center magnetic pole 52. The four permanent magnets 51 magnetized parallelly are respectively provided at four sides of the center magnetic pole 52, and closely engage with outer surfaces of the center magnetic pole 52. The magnetization directions of the four permanent magnets 51 magnetized parallelly are toward or opposite to the center magnetic pole 52, and the magnetization directions are parallel to axis X and axis Y.

Embodiment 10

In the secondary structure of the permanent magnet synchronous planar motor with the structure of concentric winding, as recited in the embodiment 5~9, the two permanent magnets forming the center magnetic pole 52 are integrated.

Embodiment 11

Figure 18:
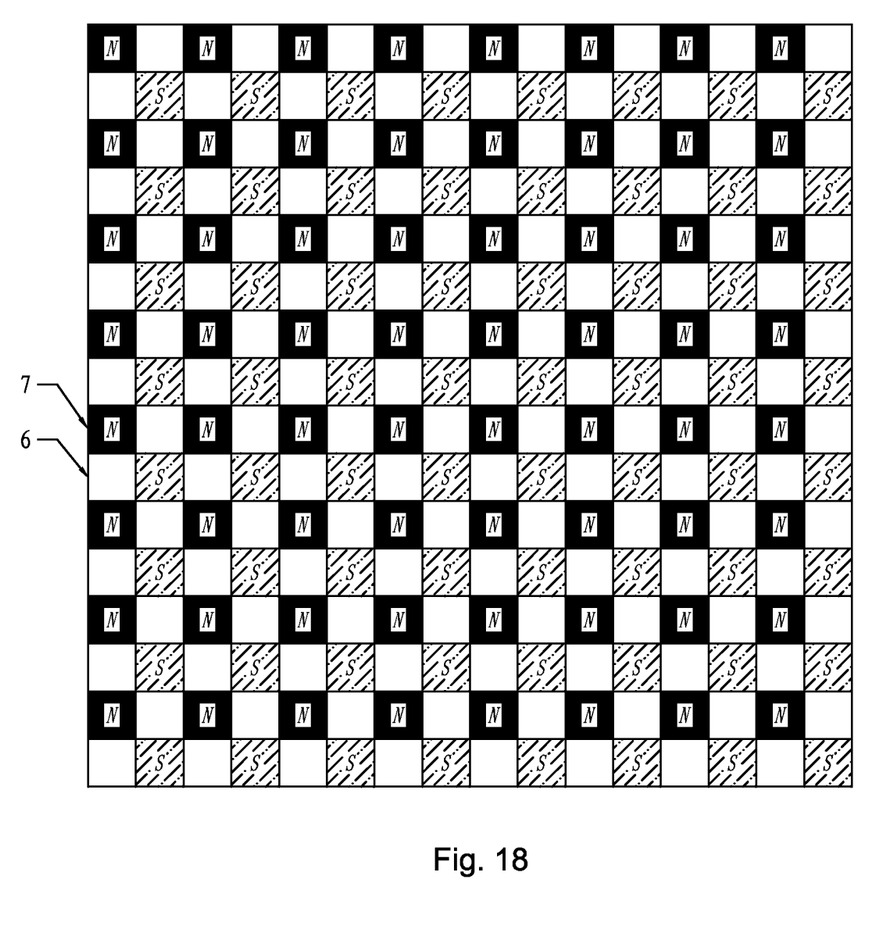
FIG. 18 is a sketch view of the secondary structure according to embodiment 10.

The embodiment 11 shows further limitations of the secondary structure of the permanent magnet synchronous planar motor with the structure of concentric winding, as recited in the embodiment 1, the embodiment 2, or the embodiment 3. Referring to FIG. 18, the secondary structure comprises a secondary yoke plate 6, and permanent magnets 7, wherein the secondary yoke plate 6 has a structure of board, the secondary yoke plate 6 is evenly divided into 2i×2h permanent magnet cells, wherein i and h are both integers larger than 1, the permanent magnets 7 are respectively embedded into the permanent magnet cells, the permanent magnets 7 are not adjacent to each other, neither in a horizontal direction nor in a vertical direction, the permanent magnets 7 in a same row or a same column have same magnetization directions, and the permanent magnets 7 in two adjacent rows or two adjacent columns have opposite magnetization directions.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A permanent magnet synchronous planar motor with a structure of concentric winding, comprising: a primary structure, a secondary structure, and an air gap, wherein said primary structure comprises: a primary base plate (2) and armature windings, said secondary structure comprises a secondary yoke plate (4) and a permanent magnet, said air gap is provided between said primary structure and said secondary structure, a mover of said permanent magnet synchronous planar motor with said structure of concentric winding realizes planar motion in plane XOY, said armature windings are fixed on an air gap side of said primary base plate (2) in a shape of board, wherein said air gap side is defined as a side adjacent to said air gap, said armature winding of each phase comprises a plurality of concentric rectangular coils (1), a distance $L_l$ between center lines of two adjacent sides of said two adjacent rectangular coils (1) is equal to a polar distance $\tau_m$ of said permanent magnet in said secondary structure, $\tau_m$ is a shortest distance from one end of said permanent magnet to another end of said permanent magnet when moving in a particular direction, said rectangular coils (1) are connected in series in turn from inside to outside, winding directions of said two adjacent rectangular coils (1) are opposite, a distance $L_c$ between center lines of two opposite sides of each of said rectangular coils (1) and said polar distance $\tau_m$ of said permanent magnet in said secondary structure have a relationship as follows, and $L_c=(2k+1)\tau_m$, wherein k is a natural number;

wherein said primary structure further comprises a deflection controlling winding, said deflection controlling winding is fixed on said air gap side of said primary base plate (2) in said shape board, said deflection controlling winding is around said armature windings, said deflection controlling winding comprises: a deflection controlling winding in an X direction, and a deflection controlling winding in a Y direction, wherein said deflection controlling winding in said X direction comprises an even number of coils, said even number of coils are evenly divided into two groups, center lines of said coils in a same group are in a same line, which is parallel to axis X, active sides of said coils are parallel to said axis X, winding directions of said adjacent coils in said same group are opposite, said two groups of coils are respectively provided at two sides of said armature windings in said direction Y, and are distributed symmetrically, said two coils provided in corresponding positions of said two sides of said armature windings have winding directions opposite to each other, said deflection controlling winding in said Y direction comprises an even number of coils, said even number of coils are evenly divided into two groups, center lines of said two coils in a same group are in a same line, which is parallel to axis Y, active sides of said coils are parallel to said axis Y, winding directions of said adjacent coils in said same group are opposite, said two groups of coils are provided at two sides of said armature windings in said direction X, and are distributed symmetrically, said two coils located in corresponding positions of said two sides of said armature windings have winding directions opposite to each other, a distance between center lines of two active sides of each of said coils forming said deflection controlling winding is equal to said polar distance $\tau_m$ of said permanent magnet in said secondary structure, and a distance $L_{c1}$ between center lines of two coils located in a same end of said primary base plate is calculated by: $L_{c1}=(i+\frac{1}{2})\tau_m$, wherein i is a natural number larger than 2.

2. The permanent magnet synchronous planar motor with a structure of concentric winding, as recited in claim 1, wherein said deflection controlling winding is in a shape of rectangle or racetrack, a distance $L_e$ between two end portions of each of coils and said polar distance $\tau_m$ of said permanent magnet in said secondary structure have a relationship as follows, $L_e=2n\tau_m$, wherein n is a positive integer, and said two end portions refer to non-active sides of said coil.

3. The permanent magnet synchronous planar motor with a structure of concentric winding, as recited in claim 2, wherein said secondary structure comprises said secondary yoke plate (4) and a plurality of magnetic pole units (5), each of said magnetic pole units (5) is a cube having a square bottom, diagonals on a surface at an air gap side of each of said magnetic pole units (5) are parallel to axis X or axis Y, said magnetic pole units (5) are fixed on an air gap side of said secondary yoke plate (4), magnetization directions of said adjacent magnetic pole units (5) are opposite to each other, each of said magnetic pole units (5) comprises a permanent magnet magnetized in a radial direction and a center magnetic pole (52), said center magnetic pole (52) has a structure of axial symmetry, an axial section of said center magnetic pole (52) is a polygon comprising two rectangles, said rectangle at said air gap side is smaller than said other rectangle, a symmetry axis of said center magnetic pole (52) is perpendicular to a surface of said secondary yoke plate (4), said center magnetic pole (52) is embedded in a center portion of said permanent magnet magnetized in said radial direction, a height of said center magnetic pole (52) is equal to a height of said permanent magnet magnetized in said radial direction, said center magnetic pole (52) is magnetized in a radial direction, and said center magnetic pole (52) comprises one or two permanent magnets.

4. The permanent magnet synchronous planar motor with a structure of concentric winding, as recited in claim 2, wherein said secondary structure comprises said secondary yoke plate (4) and a plurality of magnetic pole units (5), each of said magnetic pole units (5) is a cube having a square bottom, diagonals of each of said magnetic pole units (5) are parallel to axis X or axis Y, said magnetic pole units (5) are fixed on an air gap side of said secondary yoke plate (4), magnetization directions of said adjacent magnetic pole units (5) are opposite to each other, each of said magnetic pole units (5) comprises four permanent magnets (51) magnetized parallelly, a permanent magnet magnetized vertically, and a magnetism gathering element, magnetizing said permanent magnet parallelly means that magnetization direction of said permanent magnet is parallel to a surface of said permanent magnet at an air gap side, magnetizing said permanent magnet vertically means that magnetization direction of said permanent magnet is perpendicular to said surface of said permanent magnet at said air gap side, said permanent magnet magnetized vertically and said magnetism gathering element are cubes having square bottoms, said bottom of said magnetism gathering element is smaller than said bottom of said permanent magnet magnetized vertically, said magnetism gathering element overlaps said permanent magnet magnetized vertically in a center of an upper surface thereof, to form a center magnetic pole (52), said center magnetic pole (52) is provided in said center of said magnetic pole unit (5), said four permanent magnets (51) magnetized parallelly are irregulars having bottom projections of isosceles trapezoid, basic angles of said isosceles trapezoid are 45°, a height of said permanent magnets (51) magnetized parallelly is equal to a height of said center magnetic pole (52), said four permanent magnets (51) magnetized parallelly are respectively provided at four sides of said center magnetic pole (52), and engage with outer surfaces of said center magnetic pole (52), said magnetization directions of said four permanent magnets (51) magnetized parallelly are toward or opposite to said center magnetic pole (52), and said magnetization directions are parallel to axis X and axis Y.

5. The permanent magnet synchronous planar motor with a structure of concentric winding, as recited in claim 2, wherein said secondary structure comprises said secondary yoke plate (4) and a plurality of magnetic pole units (5), each of said magnetic pole units (5) is a cube having a square bottom, diagonals of each of said magnetic pole units (5) are parallel to axis X or axis Y, said magnetic pole units (5) are fixed on an air gap side of said secondary yoke plate (4), magnetization directions of said adjacent magnetic pole units (5) are opposite to each other, each of said magnetic pole units (5) comprises four permanent magnets magnetized in a radial direction, a permanent magnet magnetized vertically, and a magnetism gathering element, magnetizing said permanent magnet in said radial direction means that magnetization direction of said permanent magnet is parallel to a surface of said permanent magnet at an air gap side, and toward to a center of said magnetic pole unit (5), magnetizing said permanent magnet vertically means that magnetization direction of said permanent magnet is perpendicular to said surface of said permanent magnet at said air gap side, said permanent magnet magnetized vertically and said magnetism gathering element are cubes having square bottoms, said bottom of said magnetism gathering element is smaller than said bottom of said permanent magnet magnetized vertically, said magnetism gathering element overlaps said permanent magnet magnetized vertically in a center of an upper surface thereof, to form a center magnetic pole (52), said center magnetic pole (52) is provided in said center of said magnetic pole unit (5), said four permanent magnets magnetized in said radial direction are irregulars having bottom projections of isosceles trapezoid, basic angles of said isosceles trapezoid are 45°, a height of said permanent magnets magnetized in said radial direction is equal to a height of said center magnetic pole (52), said four permanent magnets magnetized in said radial direction are respectively provided at four sides of said center magnetic pole (52), and engage with outer surfaces of said center magnetic pole (52), said magnetization directions of said four permanent magnets magnetized in said radial direction are toward or opposite to said center magnetic pole (52), and said magnetization directions are parallel to axis X and axis Y.

6. The permanent magnet synchronous planar motor with a structure of concentric winding, as recited in claim 2, wherein said secondary structure comprises said secondary yoke plate (4) and a plurality of magnetic pole units (5), each of said magnetic pole units (5) is a cube having a square bottom, diagonals of each of said magnetic pole units (5) are parallel to axis X or axis Y, said magnetic pole units (5) are fixed on an air gap side of said secondary yoke plate (4), magnetization directions of said adjacent magnetic pole units (5) are opposite to each other, each of said magnetic pole units (5) comprises four permanent magnets magnetized in a radial direction, and two permanent magnets magnetized vertically, magnetizing said permanent magnet in said radial direction means that magnetization direction of said permanent magnet is parallel to a surface of said permanent magnet at an air gap side, and toward to a center of said magnetic pole unit (5), magnetizing said permanent magnet vertically means that magnetization direction of said permanent magnet is perpendicular to said surface of said permanent magnet at said air gap side, both of said two permanent magnets magnetized vertically are cubes having square bottoms, wherein said bottom of said first permanent magnet magnetized vertically is smaller than said bottom of said second permanent magnet magnetized vertically, said two permanent magnets magnetized vertically are overlapped to form a center magnetic pole (52), and said permanent magnet magnetized vertically having said smaller bottom is on said permanent magnet magnetized vertically having said larger bottom, said center magnetic pole (52) is provided in said center of said magnetic pole unit (5), said four permanent magnets magnetized in said radial direction are irregulars having bottom projections of isosceles trapezoid, basic angles of said isosceles trapezoid are 45°, a height of said permanent magnets magnetized in said radial direction is equal to a height of said center magnetic pole (52), said four permanent magnets magnetized in said radial direction are respectively provided at four sides of said center magnetic pole (52), and engage with outer surfaces of said center magnetic pole (52), said magnetization directions of said four permanent magnets magnetized in said radial direction are toward or opposite to said center magnetic pole (52), and said magnetization directions are parallel to axis X and axis Y.

7. The permanent magnet synchronous planar motor with a structure of concentric winding, as recited in claim 2, wherein said secondary structure comprises said secondary yoke plate (4) and a plurality of magnetic pole units (5), each of said magnetic pole units (5) is a cube having a square bottom, diagonals of each of said magnetic pole units (5) are parallel to axis X or axis Y, said magnetic pole units (5) are fixed on an air gap side of said secondary yoke plate (4), magnetization directions of said adjacent magnetic pole units (5) are opposite to each other, each of said magnetic pole units (5) comprises four permanent magnets (51) magnetized parallelly, and two permanent magnets magnetized vertically, magnetizing said permanent magnet parallelly means that magnetization direction of said permanent magnet is parallel to a surface of said permanent magnet at an air gap side, magnetizing said permanent magnet vertically means that magnetization direction of said permanent magnet is perpendicular to said surface of said permanent magnet at said air gap side, both of said two permanent magnets magnetized vertically are cubes having square bottoms, wherein said bottom of said first permanent magnet magnetized vertically is smaller than said bottom of said second permanent magnet magnetized vertically, said two permanent magnets magnetized vertically are overlapped to form a center magnetic pole (52), and said permanent magnet magnetized vertically having said smaller bottom is on said permanent magnet magnetized vertically having said larger bottom, said center magnetic pole (52) is provided in said center of said magnetic pole unit (5), said four permanent magnets (51) magnetized parallelly are irregulars having bottom projections of isosceles trapezoid, basic angles of said isosceles trapezoid are 45°, a height of said permanent magnets (51) magnetized parallelly is equal to a height of said center magnetic pole (52), said four permanent magnets (51) magnetized parallelly are respectively provided at four sides of said center magnetic pole (52), and engage with outer surfaces of said center magnetic pole (52), said magnetization directions of said four permanent magnets (51) magnetized parallelly are toward or opposite to said center magnetic pole (52), and said magnetization directions are parallel to axis X and axis Y.

8. The permanent magnet synchronous planar motor with a structure of concentric winding, as recited in claim 2, wherein said secondary structure comprises a secondary yoke plate (6), and permanent magnets (7), said secondary yoke plate (6) has a structure of board, said secondary yoke plate (6) is evenly divided into 2i×2h permanent magnet cells, wherein i and h are both integers larger than 1, said permanent magnets (7) are respectively embedded into said permanent magnet cells, said permanent magnets (7) are adjacent to each other, neither in a horizontal direction nor in a vertical direction, said permanent magnets (7) in a same row or a same column have same magnetization directions, and said permanent magnets (7) in two adjacent rows or two adjacent columns have opposite magnetization directions.

9. The permanent magnet synchronous planar motor with a structure of concentric winding, as recited in claim 1, wherein said secondary structure is a surface permanent magnet structure, an embedded permanent magnet structure, or Halbac permanent magnet array structure.

10. The permanent magnet synchronous planar motor with a structure of concentric winding, as recited in claim 1, wherein said secondary structure comprises said secondary yoke plate (4) and a plurality of magnetic pole units (5), each of said magnetic pole units (5) is a cube having a square bottom, diagonals on a surface at an air gap side of each of said magnetic pole units (5) are parallel to axis X or axis Y, said magnetic pole units (5) are fixed on an air gap side of said secondary yoke plate (4), magnetization directions of said adjacent magnetic pole units (5) are opposite to each other, each of said magnetic pole units (5) comprises a permanent magnet magnetized in a radial direction and a center magnetic pole (52), said center magnetic pole (52) has a structure of axial symmetry, an axial section of said center magnetic pole (52) is a polygon comprising two rectangles, said rectangle at said air gap side is smaller than said other rectangle, a symmetry axis of said center magnetic pole (52) is perpendicular to a surface of said secondary yoke plate (4), said center magnetic pole (52) is embedded in a center portion of said permanent magnet magnetized in said radial direction, a height of said center magnetic pole (52) is equal to a height of said permanent magnet magnetized in said radial direction, said center magnetic pole (52) is magnetized in a radial direction, and said center magnetic pole (52) comprises one or two permanent magnets.

11. The permanent magnet synchronous planar motor with a structure of concentric winding, as recited in claim 1, wherein said secondary structure comprises said secondary yoke plate (4) and a plurality of magnetic pole units (5), each of said magnetic pole units (5) is a cube having a square bottom, diagonals of each of said magnetic pole units (5) are parallel to axis X or axis Y, said magnetic pole units (5) are fixed on an air gap side of said secondary yoke plate (4), magnetization directions of said adjacent magnetic pole units (5) are opposite to each other, each of said magnetic pole units (5) comprises four permanent magnets (51) magnetized parallelly, a permanent magnet magnetized vertically, and a magnetism gathering element, magnetizing said permanent magnet parallelly means that magnetization direction of said permanent magnet is parallel to a surface of said permanent magnet at an air gap side, magnetizing said permanent magnet vertically means that magnetization direction of said permanent magnet is perpendicular to said surface of said permanent magnet at said air gap side, said permanent magnet magnetized vertically and said magnetism gathering element are cubes having square bottoms, said bottom of said magnetism gathering element is smaller than said bottom of said permanent magnet magnetized vertically, said magnetism gathering element overlaps said permanent magnet magnetized vertically in a center of an upper surface thereof, to form a center magnetic pole (52), said center magnetic pole (52) is provided in said center of said magnetic pole unit (5), said four permanent magnets (51) magnetized parallelly are irregulars having bottom projections of isosceles trapezoid, basic angles of said isosceles trapezoid are 45°, a height of said permanent magnets (51) magnetized parallelly is equal to a height of said center magnetic pole (52), said four permanent magnets (51) magnetized parallelly are respectively provided at four sides of said center magnetic pole (52), and engage with outer surfaces of said center magnetic pole (52), said magnetization directions of said four permanent magnets (51) magnetized parallelly are toward or opposite to said center magnetic pole (52), and said magnetization directions are parallel to axis X and axis Y.

12. The permanent magnet synchronous planar motor with a structure of concentric winding, as recited in claim 1, wherein said secondary structure comprises said secondary yoke plate (4) and a plurality of magnetic pole units (5), each of said magnetic pole units (5) is a cube having a square bottom, diagonals of each of said magnetic pole units (5) are parallel to axis X or axis Y, said magnetic pole units (5) are fixed on an air gap side of said secondary yoke plate (4), magnetization directions of said adjacent magnetic pole units (5) are opposite to each other, each of said magnetic pole units (5) comprises four permanent magnets magnetized in a radial direction, a permanent magnet magnetized vertically, and a magnetism gathering element, magnetizing said permanent magnet in said radial direction means that magnetization direction of said permanent magnet is parallel to a surface of said permanent magnet at an air gap side, and toward to a center of said magnetic pole unit (5), magnetizing said permanent magnet vertically means that magnetization direction of said permanent magnet is perpendicular to said surface of said permanent magnet at said air gap side, said permanent magnet magnetized vertically and said magnetism gathering element are cubes having square bottoms, said bottom of said magnetism gathering element is smaller than said bottom of said permanent magnet magnetized vertically, said magnetism gathering element overlaps said permanent magnet magnetized vertically in a center of an upper surface thereof, to form a center magnetic pole (52), said center magnetic pole (52) is provided in said center of said magnetic pole unit (5), said four permanent magnets magnetized in said radial direction are irregulars having bottom projections of isosceles trapezoid, basic angles of said isosceles trapezoid are 45°, a height of said permanent magnets magnetized in said radial direction is equal to a height of said center magnetic pole (52), said four permanent magnets magnetized in said radial direction are respectively provided at four sides of said center magnetic pole (52), and engage with outer surfaces of said center magnetic pole (52), said magnetization directions of said four permanent magnets magnetized in said radial direction are toward or opposite to said center magnetic pole (52), and said magnetization directions are parallel to axis X and axis Y.

13. The permanent magnet synchronous planar motor with a structure of concentric winding, as recited in claim 1, wherein said secondary structure comprises said secondary yoke plate (4) and a plurality of magnetic pole units (5), each of said magnetic pole units (5) is a cube having a square bottom, diagonals of each of said magnetic pole units (5) are parallel to axis X or axis Y, said magnetic pole units (5) are fixed on an air gap side of said secondary yoke plate (4), magnetization directions of said adjacent magnetic pole units (5) are opposite to each other, each of said magnetic pole units (5) comprises four permanent magnets magnetized in a radial direction, and two permanent magnets magnetized vertically, magnetizing said permanent magnet in said radial direction means that magnetization direction of said permanent magnet is parallel to a surface of said permanent magnet at an air gap side, and toward to a center of said magnetic pole unit (5), magnetizing said permanent magnet vertically means that magnetization direction of said permanent magnet is perpendicular to said surface of said permanent magnet at said air gap side, both of said two permanent magnets magnetized vertically are cubes having square bottoms, wherein said bottom of said first permanent magnet magnetized vertically is smaller than said bottom of said second permanent magnet magnetized vertically, said two permanent magnets magnetized vertically are overlapped to form a center magnetic pole (52), and said permanent magnet magnetized vertically having said smaller bottom is on said permanent magnet magnetized vertically having said larger bottom, said center magnetic pole (52) is provided in said center of said magnetic pole unit (5), said four permanent magnets magnetized in said radial direction are irregulars having bottom projections of isosceles trapezoid, basic angles of said isosceles trapezoid are 45°, a height of said permanent magnets magnetized in said radial direction is equal to a height of said center magnetic pole (52), said four permanent magnets magnetized in said radial direction are respectively provided at four sides of said center magnetic pole (52), and engage with outer surfaces of said center magnetic pole (52), said magnetization directions of said four permanent magnets magnetized in said radial direction are toward or opposite to said center magnetic pole (52), and said magnetization directions are parallel to axis X and axis Y.

14. The permanent magnet synchronous planar motor with a structure of concentric winding, as recited in claim 1, wherein said secondary structure comprises said secondary yoke plate (4) and a plurality of magnetic pole units (5), each of said magnetic pole units (5) is a cube having a square bottom, diagonals of each of said magnetic pole units (5) are parallel to axis X or axis Y, said magnetic pole units (5) are fixed on an air gap side of said secondary yoke plate (4), magnetization directions of said adjacent magnetic pole units (5) are opposite to each other, each of said magnetic pole units (5) comprises four permanent magnets (51) magnetized parallelly, and two permanent magnets magnetized vertically, magnetizing said permanent magnet parallelly means that magnetization direction of said permanent magnet is parallel to a surface of said permanent magnet at an air gap side, magnetizing said permanent magnet vertically means that magnetization direction of said permanent magnet is perpendicular to said surface of said permanent magnet at said air gap side, both of said two permanent magnets magnetized vertically are cubes having square bottoms, wherein said bottom of said first permanent magnet magnetized vertically is smaller than said bottom of said second permanent magnet magnetized vertically, said two permanent magnets magnetized vertically are overlapped to form a center magnetic pole (52), and said permanent magnet magnetized vertically having said smaller bottom is on said permanent magnet magnetized vertically having said larger bottom, said center magnetic pole (52) is provided in said center of said magnetic pole unit (5), said four permanent magnets (51) magnetized parallelly are irregulars having bottom projections of isosceles trapezoid, basic angles of said isosceles trapezoid are 45°, a height of said permanent magnets (51) magnetized parallelly is equal to a height of said center magnetic pole (52), said four permanent magnets (51) magnetized parallelly are respectively provided at four sides of said center magnetic pole (52), and engage with outer surfaces of said center magnetic pole (52), said magnetization directions of said four permanent magnets (51) magnetized parallelly are toward or opposite to said center magnetic pole (52), and said magnetization directions are parallel to axis X and axis Y.

15. The permanent magnet synchronous planar motor with a structure of concentric winding, as recited in claim 1, wherein said secondary structure comprises a secondary yoke plate (6), and permanent magnets (7), said secondary yoke plate (6) has a structure of board, said secondary yoke plate (6) is evenly divided into 2i×2h permanent magnet cells, wherein i and h are both integers larger than 1, said permanent magnets (7) are respectively embedded into said permanent magnet cells, said permanent magnets (7) are adjacent to each other, neither in a horizontal direction nor in a vertical direction, said permanent magnets (7) in a same row or a same column have same magnetization directions, and said permanent magnets (7) in two adjacent rows or two adjacent columns have opposite magnetization directions.

* * * * *